United States Patent
Bunker

(10) Patent No.: US 9,275,008 B2
(45) Date of Patent: Mar. 1, 2016

(54) METHOD AND APPARATUS OF TRIGGERING AN ACTIVE DEVICE OF A VEHICLE

(75) Inventor: Paul Bunker, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 222 days.

(21) Appl. No.: 13/434,763

(22) Filed: Mar. 29, 2012

(65) Prior Publication Data

US 2013/0079997 A1 Mar. 28, 2013

(30) Foreign Application Priority Data

Mar. 29, 2011 (GB) .................................. 1105279.2

(51) Int. Cl.
*G06F 17/00* (2006.01)
*B60R 21/0132* (2006.01)
*B60R 21/01* (2006.01)
*B60R 21/013* (2006.01)

(52) U.S. Cl.
CPC ............ *G06F 17/00* (2013.01); *B60R 21/0132* (2013.01); *B60R 2021/01272* (2013.01); *B60R 2021/01313* (2013.01); *B60T 2230/03* (2013.01)

(58) Field of Classification Search
CPC ....... G06F 17/00; B60R 21/01; B60R 21/013; B60R 21/0132; B60R 2021/01272; B60R 2021/01313; B60R 22/195; B60T 8/17554; B60W 30/08; B60W 30/085; B60W 30/0953
USPC ................................ 701/38, 45, 46
See application file for complete search history.

(56) References Cited

U.S. PATENT DOCUMENTS

| | | | |
|---|---|---|---|
| 6,104,284 A * | 8/2000 | Otsuka | 340/440 |
| 2004/0024509 A1* | 2/2004 | Salib et al. | 701/45 |
| 2005/0222727 A1 | 10/2005 | Hille et al. | |
| 2006/0064218 A1* | 3/2006 | Subbian et al. | 701/45 |
| 2008/0033616 A1* | 2/2008 | Gillet | 701/45 |
| 2008/0189013 A1 | 8/2008 | Iwazaki | |
| 2008/0221758 A1* | 9/2008 | Bernzen et al. | 701/45 |
| 2009/0174174 A1 | 7/2009 | McCoy | |
| 2010/0324774 A1 | 12/2010 | Bouni et al. | |

FOREIGN PATENT DOCUMENTS

| | | |
|---|---|---|
| CN | 101171159 A | 4/2008 |
| DE | 102005035850 | 2/2007 |
| EP | 0965502 A2 | 12/1999 |
| EP | 1110835 | 12/2000 |
| EP | 1552989 A1 | 7/2005 |
| EP | 2127988 A1 | 12/2009 |
| GB | 2424983 A | 10/2006 |
| JP | 2000159079 A | 6/2000 |
| WO | 0196152 A1 | 12/2001 |
| WO | 2006122742 A1 | 11/2006 |

OTHER PUBLICATIONS

English machine translation of foreign patent reference JP 2000159079.*

(Continued)

*Primary Examiner* — John Q Nguyen
*Assistant Examiner* — Anshul Sood
(74) *Attorney, Agent, or Firm* — Reising Ethington P.C.

(57) ABSTRACT

An active device of a vehicle, for example a seat belt tensioner, is triggered by reference to an estimated vehicle roll rate exceeding a threshold roll rate. The estimated vehicle roll rate may be conditioned according to vehicle speed, and is determined from inputs of vehicle lateral acceleration, steering wheel angle, and steering wheel speed.

10 Claims, 1 Drawing Sheet

(56) References Cited

OTHER PUBLICATIONS

UK Search Report for GB1105279.2, dated Jul. 28, 2011, 3 pages.
English translation of First Chinese Office action corresponding to application No. 201210088862.5, dated Mar. 16, 2015, 7 pages.
English summary of first Search Report for CN application No. 201210088862.5, dated Mar. 16, 2015, 2 pages.
European Search Report for corresponding application No. 12161984.5, dated Jul. 8, 2013, 5 pages.
English summary of supplemental Search Report for CN application No. 201210088862.5, dated Oct. 14, 2015, 2 pages.
Translation of Second Chinese Office action corresponding to CN application No. 201210088862.5, dated Oct. 14, 2015, 7 pages.

* cited by examiner

METHOD AND APPARATUS OF TRIGGERING AN ACTIVE DEVICE OF A VEHICLE

FIELD OF THE INVENTION

This invention relates to control of one or more active devices of a vehicle in response to lateral acceleration(s) of said vehicle, in particular in conditions where lateral acceleration of the vehicle causes the roll rate of the vehicle body to exceed a predetermined threshold. Lateral acceleration is experienced during cornering of a vehicle. Aspects of the invention relate to a method, to a system and to a vehicle.

BACKGROUND

It is known to deploy active devices of a vehicle according to a certain detected threshold. Such active devices may comprise for example occupant restraints such as active seat belt tensioners, active seat bolsters or other resettable devices intended to enhance occupant comfort during driving.

The threshold may be determined by, for example, proximity to an obstacle, or in response to reaching a predetermined speed.

A vehicle occupant will tend to move in the vehicle seat under the effect of cornering forces, and ideally an active device should be deployed before such movement commences.

There may however be an inevitable delay in deployment of an active device as the measured parameter increases toward the threshold, and it would be desirable to provide compensation whereby this delay is eliminated or at least ameliorated in certain conditions of use of the vehicle.

In particular, the lateral acceleration of a vehicle typically peaks just prior to the vehicle exiting a corner, thus causing an inherent delay in actuation or deployment of an active device of the vehicle in response to high cornering forces, where the device is triggered at a threshold. Lateral acceleration alone is thus an unsuitable indication as to the category of a cornering event, because the acceleration value peaks as the vehicle exits rather than enters a corner.

As a consequence the vehicle occupant is generally moving relative to the interior of the vehicle as the active device is deployed, and is typically arrested abruptly by a locked seat belt. This solution is thus not optimised for occupant comfort, and may be irritating if the threshold is set too low because the active device(s) will be repeatedly deployed. On the other hand a high threshold permits greater movement of an occupant before deployment, and a correspondingly higher contact load as the active device has effect.

What is required is an early indication of the category of a cornering event so that activation of such active devices can occur with sufficient time for the active device to deploy in a timely manner, and have a more acceptable effect on the vehicle and/or the vehicle occupants. By category is meant a measure of the increasing effect of a corner on the vehicle and occupants. Thus a large radius corner may have a low category, and a small radius corner may have a high category for a given vehicle speed. Ideally a solution should have a small number of measured variables, or inputs, so as to facilitate a rapid calculation/assessment of the need to trigger an active device of the vehicle.

It is an aim of the present invention to address this issue. Other aims and advantages of the invention will become apparent from the following description, claims and drawings.

SUMMARY OF THE INVENTION

According to one aspect of the invention for which protection is sought, there is provided a method of triggering an active device of a vehicle, the method comprising the steps of repeatedly providing a first input of lateral acceleration of the vehicle, providing a second input of steering angle, providing a third input of rate of change of steering angle, determining an estimated vehicle roll rate from said first, second and third inputs, applying a threshold roll rate and triggering an active device of the vehicle if said threshold roll rate is exceeded by said estimated vehicle roll rate.

Advantageously, the rate of roll of the vehicle body provides a more timely trigger for deploying a resettable device such as an active seat belt tensioner, or an active seat bolster, during a cornering manoeuvre. This is because an increase in vehicle body roll rate typically precedes an increase in vehicle lateral acceleration.

It will be understood that said third input may be calculated from a change in said second input by reference to a clock signal. For example steering angle may be provided as an electronic input to the electronic control unit (ECU) of a vehicle, and the rate of change thereof calculated by reference to an internal clock signal of the ECU. Steering angle may be provided by a sensor of steering wheel position.

The estimated vehicle roll rate may be determined by applying a suitable algorithm to the inputs of lateral acceleration, steering angle, and rate of change of steering angle, for example by position and speed of angular rotation of the steering wheel relative to the straight ahead condition. The estimated roll rate may alternatively be determined from these inputs by reference to a look-up table in which empirically derived values are stored by reference to individual vehicle or vehicle model.

The particular method and means which are selected for determining the estimated vehicle roll rate depend upon the vehicle or vehicle model in question and will be selected by the skilled man using appropriate knowledge and judgement. This invention is particularly concerned with applying steering wheel angle (for example departure from the straight ahead condition) and rate of change of steering angle to give an estimation of roll rate, to which one or more thresholds may be applied.

The use of steering angle as an input allows for small deviations to be ignored; thus minor steering movements and corrections can be filtered out so as to avoid unnecessary operation of the active device(s). Similarly an input of rate of change of steering angle allows the severity of a directional command to be determined.

Thus in one embodiment, the method may be inhibited unless steering angle and rate of change of steering angle exceed respective pre-selected minimum values.

Successive thresholds may be applied to allow the speed and/or rate of deployment of the active device(s) to be varied. Typically the greater the category of corner, the faster the deployment. The use of several speed thresholds may also permit the speed and/or rate of release after activation of an active device to be varied. Thus a speed threshold may be exceeded in a negative sense as a device is released or stowed.

Typically the threshold roll rate and threshold speed may be used to activate an active seat belt tensioner, increasing seat belt tension to reduce belt slack, and/or tension a seat belt with increased speed, and/or re-position a seat bolster and/or adjust stiffness of a seat bolster.

In an embodiment the method includes the further steps of measuring vehicle speed and determining a corresponding conditioned estimated vehicle roll rate to which the threshold roll rate is applied.

These steps allow the category of a corner to be changed with increasing vehicle speed, and accordingly more closely approach a desirable control characteristic of the vehicle. Thus a large radius corner taken at high speed may indicate the same category as a lesser radius corner taken at lower speed. A large radius corner taken at low speed will however indicate a category (e.g. low) quite different from a small radius corner taken at high speed (category: high).

In this specification an active device is a device, typically actuated by an electric motor, which changes condition in response to a change in vehicle state.

The invention disclosed herein is typically realised in an electronic control unit (ECU) of a vehicle using signals transmitted via a CAN-bus network, or equivalent.

Within the scope of this application it is envisaged that the various aspects, embodiments, examples, features and alternatives set out in the preceding paragraphs, in the claims and/or in the following description and drawings may be taken independently or in any combination thereof.

BRIEF DESCRIPTION OF THE DRAWINGS

The present invention will now be described, by way of example only, with reference to the accompanying drawings in which.

DETAILED DESCRIPTION OF THE ILLUSTRATED EMBODIMENTS

Figure 1:
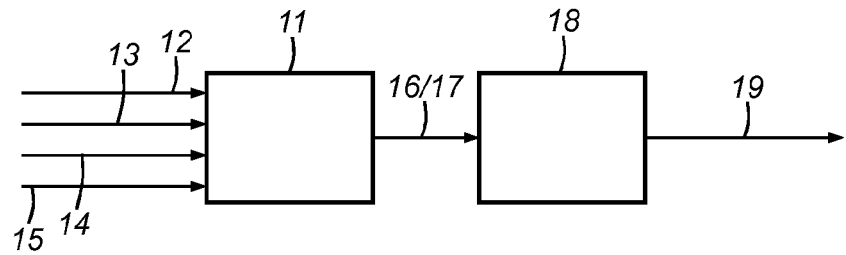
FIG. 1 is a block diagram illustrating one embodiment of the invention.

With reference to the accompanying drawings, FIG. 1 comprises a calculation module (11) having electrical inputs representative of vehicle lateral acceleration (12), vehicle speed (13), steering wheel angle (14) and steering wheel speed (15).

Vehicle lateral acceleration is provided from suitable sensors such as accelerometers mounted on the vehicle. Vehicle speed may be provided in any suitable manner, for example from a pulse counter associated with road wheel rotational speed sensors. Steering wheel angle represents departure of the steering wheel from the straight ahead condition, is a measure of steering angle, and may be sensed for example by a potentiometer or rotary encoder. Steering wheel speed is calculated by comparing the change of steering wheel position with a clock signal, and is a measure of rate of change of steering angle. Some or all of the required inputs 12-15 may be available or derived from signals on a vehicle CAN-bus, or the like.

The calculation module (11), for example a microprocessor, determines an estimated vehicle roll rate (16) in an appropriate manner. For example the inputs 12, 14 and 15 may permit interpolation of roll rate from a look-up table containing values determined empirically for the vehicle concerned. The calculation module (11) may apply an algorithm from which a theoretical vehicle roll rate is determined, and some inputs may be given more weight than others, so that the estimated vehicle roll rate is appropriate to the vehicle or vehicle model in question. The number of inputs is low, and accordingly the result can be determined rapidly and without excessive complication.

The calculation module (11) further applies a sensitivity factor to the estimated roll rate, which is dependent on vehicle speed. At higher vehicle speeds the likelihood of a need for deployment or actuation of an active device of a vehicle is increased, and the sensitivity factor provides appropriate compensation.

Finally, the calculation module (11) further identifies corners of appropriate category—typically by associating a relatively high lateral acceleration accompanied by relatively large change of steering angle and relatively high rate of change of steering angle. Increasing category typically necessitates earlier deployment of an active device. The estimated roll rate is thus further conditioned so as to more closely approximate the likely actual conditions appropriate to deployment or actuation of an active device of the vehicle, and an output signal (17) indicative of the estimated roll rate (16) is generated.

Typically the output signal initiates deployment of the active device(s), and may comprise a plurality of levels whereby the active device(s) are deployed at increasing speed and/or increasing rate.

In FIG. 1, a command module (18) applies one or more trigger points to determine actuation or deployment of the active devices, and output (19) represents such deployment.

Figure 2:
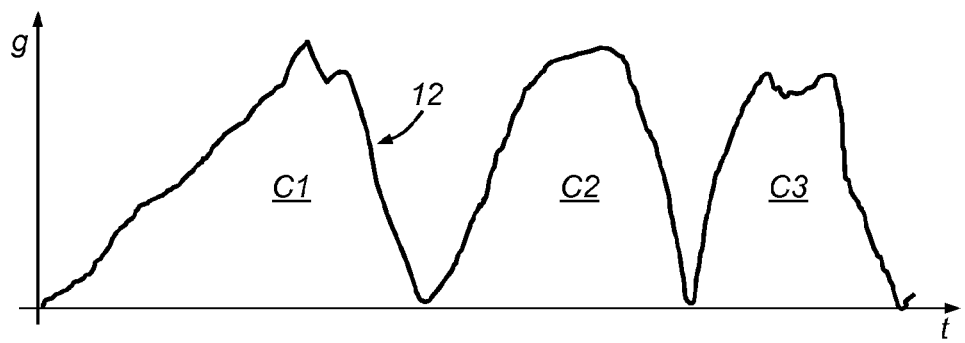
FIG. 2 illustrates graphically the lateral acceleration of a vehicle in three successive corners.

FIG. 2 represents lateral vehicle acceleration in three successive different corners C1-C3. The y axis represents lateral acceleration (g) and is plotted against time t. The third corner C3 has a substantially lower peak lateral acceleration. The second and third corners C2, C3 show lateral acceleration rising more quickly than in the first corner C1.

Figure 3:
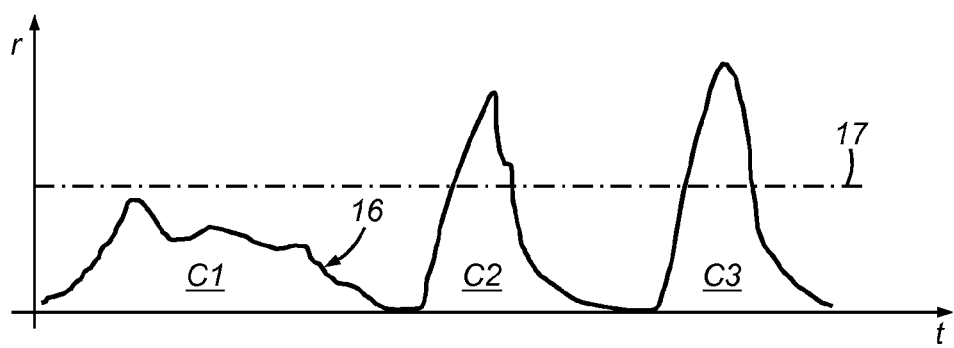
FIG. 3 illustrates graphically a calculated roll rate for the corners of FIG. 2, and the effect of applying the embodiment of FIG. 1.

FIG. 3 is a plot of conditioned roll rate (r) against time t. A trigger level represents a threshold (17) for deployment of one or more active devices of the vehicle.

Corner C1 shows a low peak conditioned estimated roll rate, below the threshold (17) and associated with a lower rate of increase of lateral acceleration, whereas corners C2 and C3 show peak conditioned estimated roll rates which exceed the threshold (17), and thus trigger the required active device(s).

Only one threshold/trigger (17) is illustrated in FIG. 3, but it is of course possible to apply several thresholds of increasing severity, for example to tension a seat belt to one of several loads and/or at one of several speeds, and/or at one of several rates of change. Thus in the example illustrated, a higher threshold may permit triggering in corner C3, but not in corner C2.

In this invention active devices are described which relate to occupant restraints. Other active devices, such as vehicle aerodynamic aids may also be activated according to the invention—such devices may comprise aerofoils and spoilers intended to enhance vehicle performance, and are deployable particularly with reference to higher vehicle speeds.

Other advantages will be apparent to one skilled in the art and the present examples and embodiments are to be considered illustrative and not restrictive. The invention is not to be limited to the details given herein, but may be modified within the scope and equivalence of the appended claims.

The invention claimed is:

1. A method of triggering an active device of a vehicle, the method comprising:
providing a first input of lateral acceleration of the vehicle;
providing a second input of steering angle;
providing a third input of rate of change of steering angle;
determining an estimated vehicle roll rate from only said first, second and third inputs; and triggering an active device of the vehicle if the estimated vehicle roll rate exceeds a threshold roll rate.

2. A method according to claim 1, whereby said estimated vehicle roll rate is determined from a look-up table directly associating said first, second and third inputs with said estimated vehicle roll rate.

3. A method according to claim 1 and having a plurality of threshold roll rates, the active device being triggered differently as successive threshold roll rates are exceeded.

4. A method according to claim 3, whereby different ones of the plurality of threshold roll rates are respectively associated with one or more of:
 a different applied load of said active device;
 a different rate of applying a load associated with said active device;
 a different speed of movement of said active device; and
 a different rate of change of speed of said active device.

5. A method accordingly to claim 1, and further including the step of conditioning said estimated vehicle roll rate by reference to vehicle speed, said active device being triggered if a threshold roll rate is exceeded by the conditioned estimated vehicle roll rate.

6. A method according to claim 5, whereby said conditioned estimated vehicle roll rate is determined from a look-up table associating said estimated vehicle roll rate with vehicle speed.

7. A method according to claim 1, whereby triggering an active device is associated with one or both of:
 a seat belt tensioner and
 a seat bolster.

8. A method of claim 1 implemented in an electronic control unit of said vehicle having sensors providing electrical signals indicative of lateral vehicle acceleration, steering wheel angle and vehicle speed, and said electronic control unit further having a clock reference for use in determining rates of change of said signals.

9. An apparatus for a vehicle adapted to perform the method of claim 1.

10. A vehicle having an apparatus as claimed in claim 9.

* * * * *